US008683464B2

(12) United States Patent
Rozee et al.

(10) Patent No.: US 8,683,464 B2
(45) Date of Patent: Mar. 25, 2014

(54) EFFICIENT VIRTUAL MACHINE MANAGEMENT

(75) Inventors: David B. Rozee, Bellevue, WA (US); Sergio Cherskov, Redmond, WA (US); Michael James Allman, Shoreline, WA (US); Wayne Kent Vincent, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 972 days.

(21) Appl. No.: 12/478,612

(22) Filed: Jun. 4, 2009

(65) Prior Publication Data

US 2010/0313200 A1  Dec. 9, 2010

(51) Int. Cl.
*G06F 9/455* (2006.01)

(52) U.S. Cl.
USPC .......................................................... 718/1

(58) Field of Classification Search
USPC .......................................................... 718/1
See application file for complete search history.

(56) References Cited

U.S. PATENT DOCUMENTS

| | | | | |
|---|---|---|---|---|
| 7,577,722 | B1 * | 8/2009 | Khandekar et al. | 709/220 |
| 7,840,839 | B2 * | 11/2010 | Scales et al. | 714/13 |
| 8,001,247 | B2 * | 8/2011 | Salevan et al. | 709/226 |
| 2006/0184935 | A1 * | 8/2006 | Abels et al. | 718/1 |
| 2006/0184936 | A1 * | 8/2006 | Abels et al. | 718/1 |
| 2006/0184937 | A1 * | 8/2006 | Abels et al. | 718/1 |
| 2008/0126834 | A1 | 5/2008 | Sankaran | |
| 2008/0155223 | A1 | 6/2008 | Hiltgen | |
| 2008/0163171 | A1 * | 7/2008 | Chess et al. | 717/120 |
| 2008/0163194 | A1 * | 7/2008 | Dias et al. | 717/174 |
| 2008/0201709 | A1 | 8/2008 | Hodges | |
| 2008/0222234 | A1 | 9/2008 | Marchand | |
| 2008/0244579 | A1 * | 10/2008 | Muller | 718/100 |
| 2009/0006534 | A1 | 1/2009 | Fries | |
| 2009/0204961 | A1 * | 8/2009 | DeHaan et al. | 718/1 |
| 2009/0260007 | A1 * | 10/2009 | Beaty et al. | 718/1 |
| 2009/0282404 | A1 * | 11/2009 | Khandekar et al. | 718/1 |
| 2010/0057913 | A1 * | 3/2010 | DeHaan | 709/226 |

FOREIGN PATENT DOCUMENTS

EP      2043320      4/2009

OTHER PUBLICATIONS

Author Unknown; "Automate Provisioning to Help Optimize Data Center Resources and Reduce Complexity in the Virtual Environment"; Sep. 2007; pp. 1-4; ftp://ftp.software.ibm.com/software/tivoli/solutionsheets/TIS10433-USEN-00.pdf.

(Continued)

*Primary Examiner* — Jennifer To
(74) *Attorney, Agent, or Firm* — David Andrews; Nicholas Chen; Micky Minhas

(57) ABSTRACT

Embodiments are directed to dynamically creating and managing a plurality of virtual machines and automating the instantiation and provisioning of a plurality of virtual machines. A computer system receives a user request to create virtual machines, where each virtual machine is controlled by an associated workflow. The computer system accesses a provisioning schema that indicates various configuration settings that are to be used by the associated workflow when provisioning the virtual machines. The computer system initiates a virtual service layer configured to support multiple virtual machine hosts, where each host is configured to operate at least one virtual machine. The computer system also instantiates the virtual machines on at least one virtual machine host according to the accessed provisioning schema, so that each virtual machine is provisioned according to the indicated configuration settings.

18 Claims, 4 Drawing Sheets

(56) References Cited

OTHER PUBLICATIONS

Author Unknown; "Automatic Virtual Machine Provisioning"; 2009; pp. 1-2; http://www.priorartdatabase.com/IPCOM/000128928/.
Rachan; "Virtual Server Features"; 2009; pp. 1-8; http://technet.microsoft.com/en-us/library/cc720335.aspx.
Author Unknown; "System Center Virtual Machine Manager Product Overview"; 2009; pp. 1-8; http://www.diraction.ch/shopdocs/files/System%20Center%20Virtual%20Machine%20-Manager%20Product%20Overview.pdf.
Author Unknown; "Virtual Server Features"; 2009; http://technet.microsoft.com/en-us/library/cc720335.aspx.

* cited by examiner ured to support multiple virtual machine hosts, where each host is configured to operate at least one virtual machine. The computer system also automatically instantiates the virtual machines on at least one virtual machine host based on the following: the accessed provisioning schema, the read-only parent virtual hard disk image and the user-supplied files, such that each virtual machine is provisioned using the virtual hard disk image as a template and is modified by the schema configuration settings and by the user-supplied files.

EFFICIENT VIRTUAL MACHINE MANAGEMENT

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. In some instances, software applications may be designed to create and run virtual computer systems or virtual machines. Virtual machines are computer systems that are configured to run on top of an existing computer system. A virtual machine typically includes an operating system and applications that have been installed by the user. Virtual machines can be booted and shut down while the host operating system is still running. Virtual machine state can be stored in a data store, thus allowing for a user to create multiple versions of a virtual machine.

For example, in a software testing scenario, a user may create a virtual machine with a Linux-based operating system and a virtual machine with a Windows®-based operating system. The user may further create variants on either system where the operating system has modified settings and/or different programs installed. For instance, a user may have one virtual machine with applications A, B and C, while another virtual machine has applications C, D and E. Many such variations are possible. As a result, a software test facility or other entity may create many hundreds or even thousands of different virtual machines. Managing such a large number of virtual machines can often be cumbersome.

BRIEF SUMMARY

Embodiments described herein are directed to dynamically creating and managing a plurality of virtual machines and automating the instantiation and provisioning of a plurality of virtual machines. In one embodiment, a computer system receives a user request to create virtual machines, where each virtual machine is controlled by an associated workflow. The computer system accesses a provisioning schema that indicates various configuration settings that are to be used by the associated workflow when provisioning the virtual machines. The computer system initiates a virtual service layer configured to support multiple virtual machine hosts, where each host is configured to operate at least one virtual machine. The computer system also instantiates the virtual machines on at least one virtual machine host according to the accessed provisioning schema, so that each virtual machine is provisioned according to the indicated configuration settings.

In another embodiment, a computer system receives a user request to instantiate virtual machines, where each virtual machine is controlled by an associated workflow, and where the user request includes files that are to be stored for use during provisioning. The computer system accesses a provisioning schema that indicates configuration settings that are to be used by the associated workflow when provisioning the virtual machines, and where the schema further points to a read-only parent virtual hard disk image that provides a template for provisioning the virtual machine. The computer system initiates a virtual service layer configured to support multiple virtual machine hosts, where each host is configured to operate at least one virtual machine. The computer system also automatically instantiates the virtual machines on at least one virtual machine host based on the following: the accessed provisioning schema, the read-only parent virtual hard disk image and the user-supplied files, such that each virtual machine is provisioned using the virtual hard disk image as a template and is modified by the schema configuration settings and by the user-supplied files.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
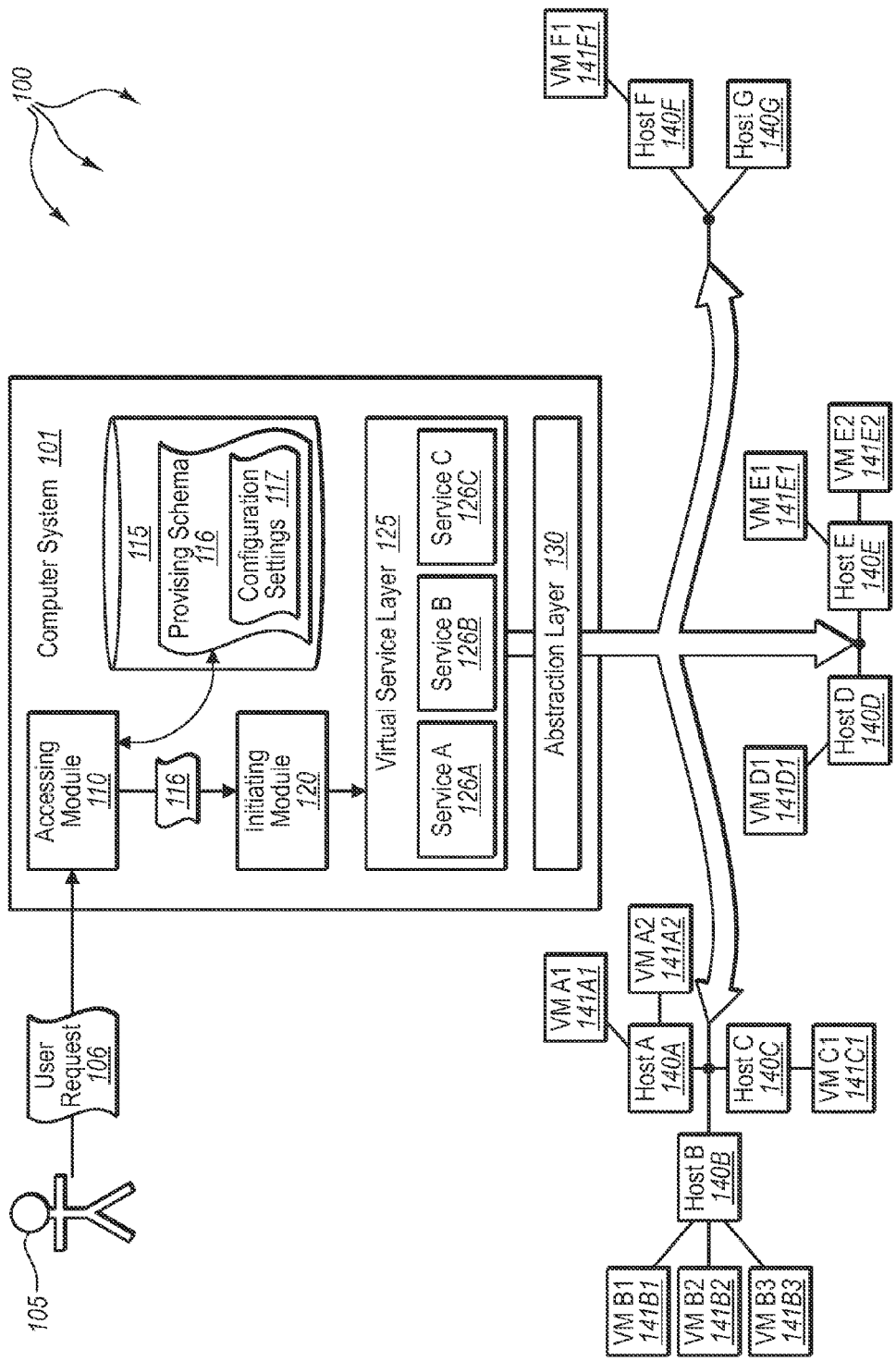
FIG. 1 illustrates a computer architecture in which embodiments of the present invention may operate including dynamically creating and managing a plurality of virtual machines.

Embodiments described herein are directed to dynamically creating and managing a plurality of virtual machines and automating the instantiation and provisioning of a plurality of virtual machines. In one embodiment, a computer system receives a user request to create virtual machines, where each virtual machine is controlled by an associated workflow. The computer system accesses a provisioning schema that indicates various configuration settings that are to be used by the associated workflow when provisioning the virtual machines. The computer system initiates a virtual service layer configured to support multiple virtual machine hosts, where each host is configured to operate at least one virtual machine. The computer system also instantiates the virtual machines on at least one virtual machine host according to the accessed provisioning schema, so that each virtual machine is provisioned according to the indicated configuration settings.

In another embodiment, a computer system receives a user request to instantiate virtual machines, where each virtual machine is controlled by an associated workflow, and where the user request includes files that are to be stored for use during provisioning. The computer system accesses a provisioning schema that indicates configuration settings that are to be used by the associated workflow when provisioning the virtual machines, and where the schema further points to a read-only parent virtual hard disk image that provides a template for provisioning the virtual machine. The computer system initiates a virtual service layer configured to support multiple virtual machine hosts, where each host is configured to operate at least one virtual machine. The computer system also automatically instantiates the virtual machines on at least one virtual machine host based on the following: the accessed provisioning schema, the read-only parent virtual hard disk image and the user-supplied files, such that each virtual machine is provisioned using the virtual hard disk image as a template and is modified by the schema configuration settings and by the user-supplied files.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, as discussed in greater detail below. Embodiments within the scope of the present invention also include physical and other computer-readable storage media for carrying or storing computer-executable instructions and/or data structures. Such computer-readable media can be any available media that can be accessed by a general purpose or special purpose computer system. Computer-readable media that store computer-executable instructions are physical storage media including recordable-type storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes computer system 101. Computer system 101 may be any type of computer system including a desktop, server, mobile computer or any other type of computing system. Computer system 101 includes various modules that may operate independently or in conjunction with modules of other computing systems. As shown in FIG. 1, computer system 101 includes accessing module 110. Accessing module 110 may be configured to receive user request 106 from user 105 where the request indicates that the user desires to create or instantiate a virtual machine.

As will be understood by one skilled in the art, a virtual machine refers to a virtual computing system that runs inside of or on top of another computing system. For instance, a host computing system may start an application within a running operating system that is configured to create or start already created virtual machines. The virtual machine then runs simultaneously with the application and operating system of the host computer system. A host machine may be configurable to run many different virtual machines simultaneously. Often, each virtual machine will have different software, a different operating system, or different configuration settings. Such groups of virtual machines are often used for software testing. A user can load various virtual machines (VM's) on a host computer and run a single application on each of the different VM's to see how the application operates on each VM.

Thus, user 105 may be a software tester and may send a request to computing system 101 to create a virtual machine. In some cases, the user may want to create multiple virtual machines that share common characteristics. In such cases, accessing module 110 may access provisioning schema 116 stored in data store 115. Provisioning schema 116 includes configuration settings 117 that are to be used when instantiating the group of VM's. Accordingly, accessing module 110 may access schema 116 and send the schema to initiating module 120 so that when the VM's are instantiated, they will include at least some of the configuration settings defined in settings 117.

Figure 4:
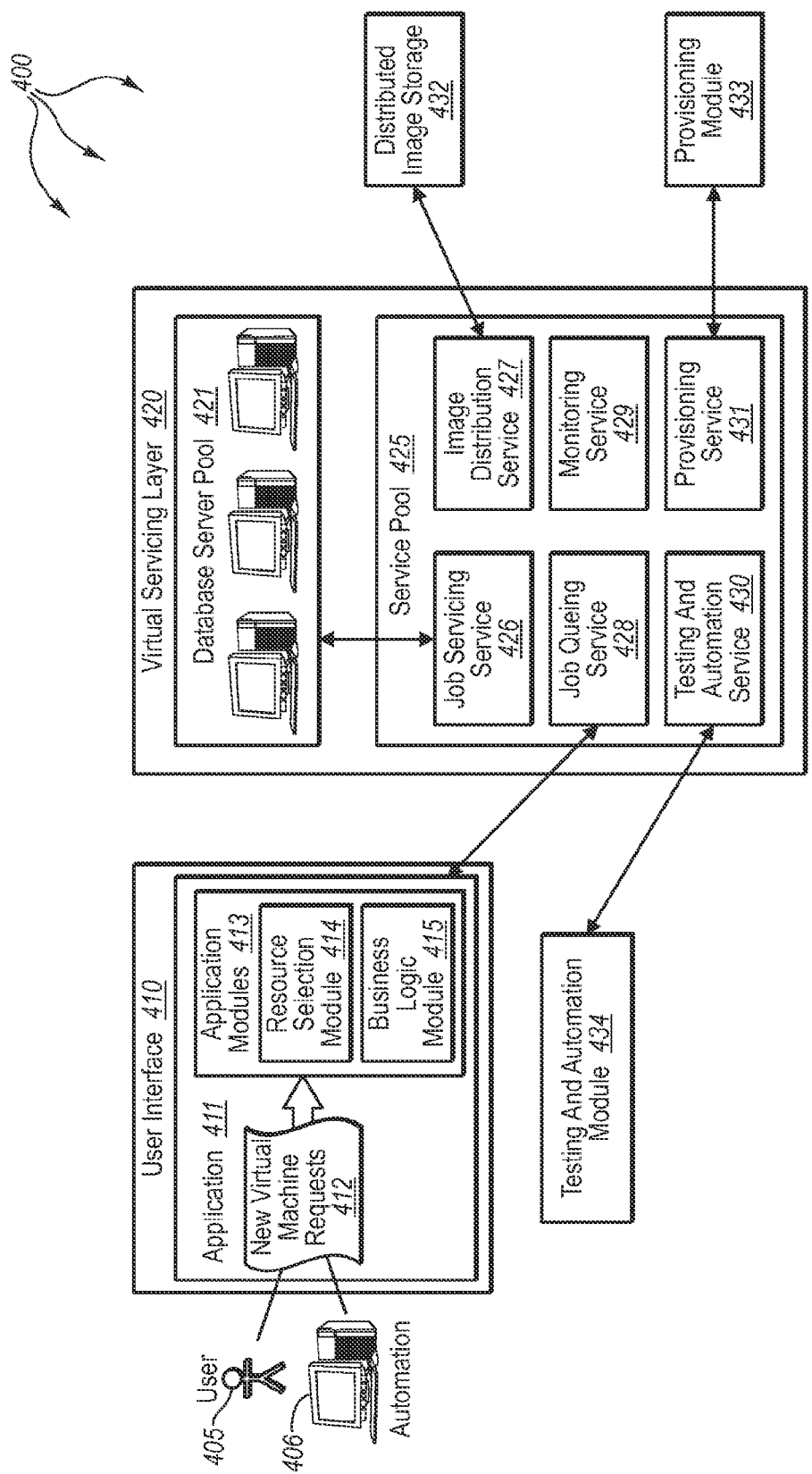
FIG. 4 illustrates an embodiment of a virtual service layer and various other components.

Initiating module 120 is configured to initiate a virtual service layer 125. As referred to herein, a virtual service layer is a portion of software code configured to run various services, interact with various modules and instantiate/provision virtual machines. Virtual service layer 125 may be configured to run substantially any number of services, and can have more or less than the three services shown: service A (126A), service B (126B) and service C (126C). Examples of the many possible services include an image distribution service, a monitoring service, a job servicing service, a job queuing service, a testing and automation service and a provisioning service. These services will be explained in greater detail below with regard to virtual service layer 420 of FIG. 4.

Computer system 101 also includes abstraction layer 130. Abstraction layer 130 may be configured to allow other third party vendors to instantiate machines using the virtual service layer. For instance, virtual service layer 125 may instantiate various virtual machines on different hosts. For example, VM A1 (141 A1) and VM A2 (141 A2) may be instantiated on host A (140A). Similarly, VM B1 (141 B1), VM B2 (141 B2) and VM B3 (141 B3) may be instantiated on host B (140B and VM C1 (141 C1) may be instantiated on host C (140C). Each of these virtual hosts A, B and C may be Hyper-V™ hosts. Hosts D and E (140D and 140E, respectively), with their corresponding virtual machines VM D1 (141 D1), VM E1 (141 E1) and VM E2 (141 E2) may be VMWare™ hosts. Hosts F (140F) and G (140G), along with their corresponding virtual machines (e.g. VM F1 (141 F1)) may be either Hyper-V, VMWare, or some other type of third party host. Third parties can use the virtual service layer because abstraction layer 130 abstracts out the software calls and other functionality to a point where third parties can access its functionality. The virtual service layer, virtual machine instantiation, and other concepts will be explained in greater detail below with regard to method 200 of FIG. 2.

Figure 2:
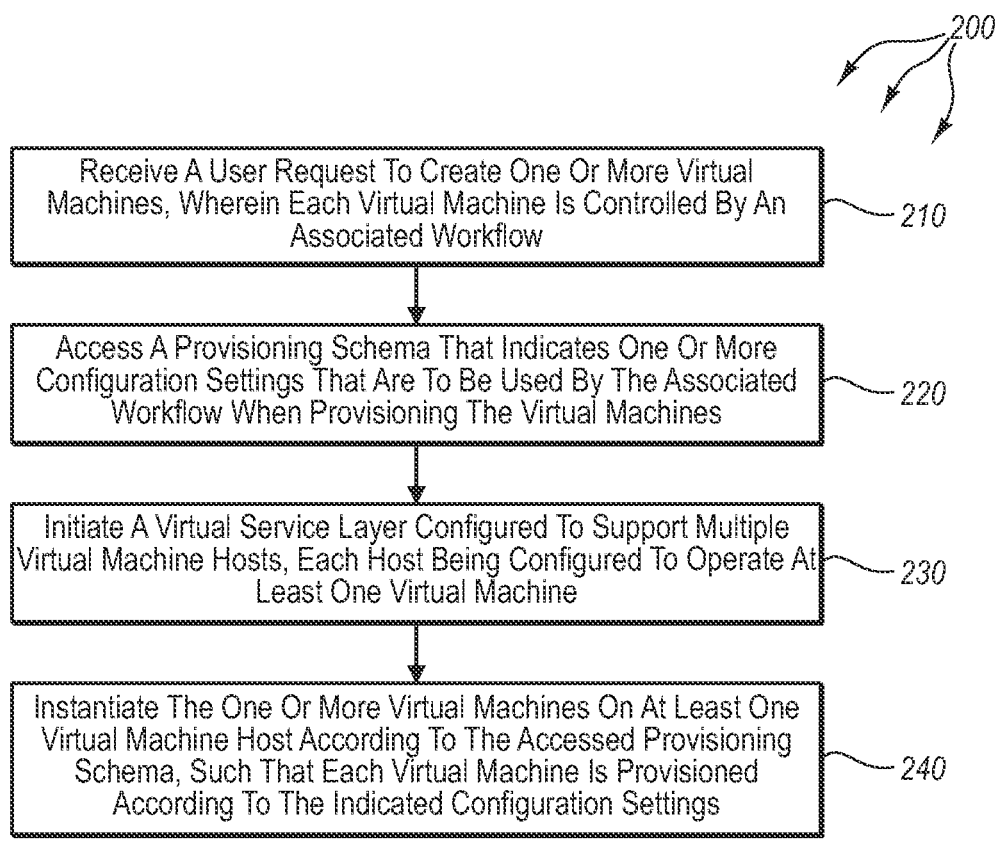
FIG. 2 illustrates a flowchart of an example method for dynamically creating and managing a plurality of virtual machines.

FIG. 2 illustrates a flowchart of a method 200 for dynamically creating and managing a plurality of virtual machines. The method 200 will now be described with frequent reference to the components and data of environment 100.

Method 200 includes an act of receiving a user request to create one or more virtual machines, wherein each virtual machine is controlled by an associated workflow (act 210). For example, accessing module 110 may receive user request 106 to create one or more virtual machines (e.g. VM A1). In some cases, each virtual machine may be controlled by an associated workflow. The workflow may dictate, for instance, when the VM is to be instantiated, what group the VM is to be part of, what configuration settings are to be used, what software the VM is to be provisioned with, what software is to be executed on the VM upon instantiation, and other settings. In other words, the workflow may have broad control over the workflow including how it is created and how it is operated. It should also be understood that workflows may be executed by a workflow execution engine which may be part of or separate from computer system 110.

Method 200 also includes an act of accessing a provisioning schema that indicates one or more configuration settings that are to be used by the associated workflow when provisioning the virtual machines (act 220). For example, accessing module 110 may access provisioning schema 116 that includes configuration settings 117 that are to be used by the controlling workflow when provisioning the VM. Thus, a user may create one or many similarly configured virtual machines using provisioning schema 116. The schema may indicate, for instance, that applications A, B and C are to be installed, with settings C1 and C2 applied to application C. Configuration settings may include settings such as hard drive space allocation, operating system settings, networking settings, security settings, user preferences, administrative account settings, commands to run on the VM to prepare it for use, or any other type of configuration setting that would define VM structure. Configuration settings may also dictate the credentials with which a given application is run or installed.

In some embodiments, the configuration settings 117 of the provisioning schema are modifiable on-the-fly, such that newly provisioned virtual machines incorporate the modified configuration settings. Thus, a user or other computer system or program can modify the schema and/or the configuration settings at any time. After modification, the new changes will be applied to any newly-created VM's. As such, in a testing environment where hundreds of VM's are created, torn down and recreated every day, a user may be able to simply change the configuration settings, resulting in every VM created after the change including the newly changed settings.

Computing system 101 may be further configured to provide a command specification in the provisioning schema that allows a user to run one or more provisioning commands. Allowing the user to run provisioning commands would give the user more control over how the VM's are provisioned. The system 101 may also allow the user to configure the provisioning commands with various properties that allow the user to monitor and control the execution of the provisioning commands. Accordingly, the user could have command-line access to (and thus command-line control over) the provisioning of VM's. It should be understood that in such scenarios, the user may be a remote and/or third party user. As a result, a user may be able to initiate machine creation as well as passing machine creation parameters via scripts or other commands.

Method 200 includes an act of initiating a virtual service layer configured to support multiple virtual machine hosts, each host being configured to operate at least one virtual machine (act 230). For example, initiating module 120 may initiate or instantiate virtual service layer 125 which is configured to support multiple different virtual machine hosts (e.g. 140A-G), where each host is configured to operate virtual machines (e.g. 141 A1, 141A2, etc.). As mentioned above, virtual service layer 125 may be configured to control multiple different aspects of VM creation. One such aspect may include the rate of virtual machine creation. Virtual service layer 125 may control the rate of virtual machine creation by controlling the number of hosts that are allowed to run at a given time and/or the number of VM's each host is allowed to host. In some cases, virtual service layer 125 may control VM creation using a service (e.g. service A (126A)). The service may create a mapping between the service and one of the virtual machine hosts (e.g. between service A (126A) and host C (140C)). The mapping allows for the service to interface with and control the host without installing an agent on the host. Accordingly, the service may control (i.e. monitor and manage) multiple virtual machine hosts without installing an agent on the host using the mapping.

In some embodiments, the virtual machines may be created on virtual hard drives (VHD's). In such cases, the service(s) of the virtual service layer may be configured to share read-only parent VHD's across a plurality of virtual machines. Sharing a VHD can save a considerable amount of disk space. Moreover, the workflow controlling VM creation can point to a parent disk in virtually any local or remote location (e.g. a SCSI share or network drive). It should also be noted that each VM can have its own VHD.

Virtual service layer 125 may be further configured to receive user-customized workflows that are to be run on one of the virtual service layer services. Upon receiving such a customized workflow, the virtual service layer may access and run it. This may allow a user to augment the workflow with external pluggable custom activities which can then be run by the virtual service layer. In this manner, layer 125 can take advantage of extensibility on the workflow level as well as failover and mapping functionality. Using customized workflows, a user can create virtual machines, schedule activities for a host, or otherwise tailor a VM to their individual needs. In some cases, a user may even implement functionality from a service running in another computer system's virtual service layer to perform a portion of desired work in virtual service layer 125.

Method 200 includes an act of the virtual service layer instantiating the one or more virtual machines on at least one virtual machine host according to the accessed provisioning schema, such that each virtual machine is provisioned according to the indicated configuration settings (act 240). For example, virtual service layer 125 may instantiate the requested virtual machines on at least one virtual machine host (e.g. host E) according to provisioning schema 116, resulting in each VM being provisioned according to schema 116 and configuration settings 117. In some cases, various additional computer systems running other virtual service layers are configured to monitor the other computer systems to which they are connected so that upon termination of a computer system, the other computer system's virtual service layers can assume the workload of the terminated system. Thus, a failover system may be put into place that allows a virtual service layer of one machine to take over the load of a failed machine. In cases where multiple systems detect the failure, the systems can divide the work of the failed node equally (or substantially so) among themselves.

In one embodiment, computer system 101 may store storing real-time virtual service layer state and workload information in data store 115. Accessing module 110 may access the stored state and workload information of a plurality of computer systems running virtual service layers and perform load balancing between the plurality of computer systems based on determined need as indicated by each computer system's stored state and workload information.

Computer system 101 may be further configured to distribute virtual hard disk images over a plurality of computer systems, so that if one computer system receives multiple substantially simultaneous requests for the virtual hard disk image, the requests are forwarded to the other computer systems on which the virtual hard disk image has been distributed. Accordingly, the load can be spread among multiple computer systems. This distribution may be peer to peer and may include substantially any number of peer nodes. Because VHD images are many times large in size, distributing the images over multiple computer systems also reduces copy time. Policies may be applied to limit or apportion certain size, data access or other limits on how and where the VHD images are distributed.

Additionally or alternatively, disk attach techniques may be used to increase input/output (I/O) bandwidth. Volume mount points may be mapped to one or more physical or virtual disks, such that upon initiation of an application, the application can use the additional volume mount points to increase informational bandwidth. Furthermore, each step during virtual machine provisioning may be stored and displayed, so that the user 105 is presented with a progressional view of the virtual machine provisioning. Within this view, the user can recall and view each step in the provisioning process including any failures or thrown exceptions. This allows for efficient monitoring and troubleshooting. Moreover, a user can dynamically implement debugging using the stored failures and exceptions.

Figure 3:
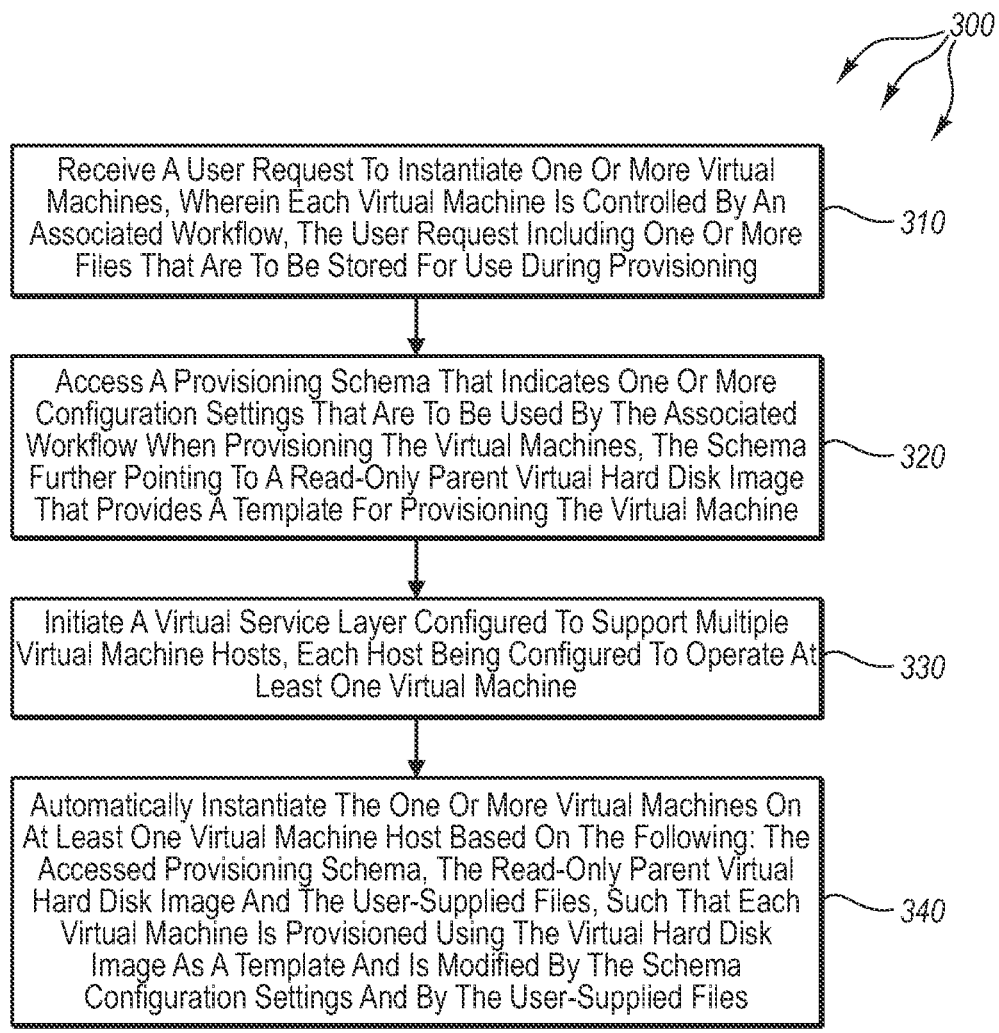
FIG. 3 illustrates a flowchart of an example method for automating the instantiation and provisioning of a plurality of virtual machines.

Turning now to FIG. 3, FIG. 3 illustrates a flowchart of a method 300 for automating the instantiation and provisioning of a plurality of virtual machines. The method 300 will now be described with frequent reference to the components and data of environments 100 of FIGS. 1 and 400 of FIG. 4.

Method 300 includes an act of receiving a user request to instantiate one or more virtual machines, wherein each virtual machine is controlled by an associated workflow, the user request including one or more files that are to be stored for use during provisioning (act 310). For example, user interface 410 of application 411 may receive a new virtual machine request 412 from either user 405 or from another computer system or automation program 406. The request may include one or more files that are to be stored for use during VM provisioning. For instance, a user may wish to supply certain files that are to be installed on each of the user's VM's. The application 411 may include multiple different application modules 413 including resource selection module 414 and business logic module 415.

Resource selection module 413 may be configured to perform multiple different functions including, but not limited to, identifying optimal hosts for the user's VM's, distributing provisioning among multiple different hosts and detecting any existing VM's that were created previously. Business logic module 415 may similarly be configured to perform different functions including, but not limited to, applying permissions settings and quotas, determining which platforms are to be made available on the VM's and applying/configuring VM profiles. Many other application modules are also possible and, like modules 414 and 415, may be accessible through user interface 410.

Method 300 also includes an act of accessing a provisioning schema that indicates one or more configuration settings that are to be used by the associated workflow when provisioning the virtual machines, the schema further pointing to a read-only parent virtual hard disk image that provides a template for provisioning the virtual machine (act 320). For example, accessing module 110 may access provisioning schema 116 that includes configuration settings 117 that are to be used by the controlling workflow when provisioning the VM's. The schema may also point to a read-only parent VHD configured to provide a template for provisioning the VM. In such cases, files or other configuration settings may be pre-loaded on the parent VHD. Then, when VM's are created on that VHD, the files and/or settings are automatically incorporated into the VM. In this manner, a user or automation system may ensure that certain files and/or settings are applied to or are a part of each VM that is created. Moreover, this aids in making the system automatable, in that a user can specify certain settings and files that are to be part of each VM, and simply tell the workflow to start creating virtual machines.

Method 300 includes an act of initiating a virtual service layer configured to support multiple virtual machine hosts, each host being configured to operate at least one virtual machine (act 330). For example, initiating module 120 may initiate virtual service layer 420 which is configured to support multiple virtual machine hosts (e.g. 140A-G), where each host is configured to host and operate various virtual machines. As mentioned above, virtual service layer 420 may include multiple different services in service pool 425. For instance, service pool 425 may include job queuing service 428 which is configured to receive and queue the new VM creation jobs from user 405 and/or automation programs 406. Job servicing service 426 may be configured to interface with database server pool 421 (which includes multiple different database servers) to ensure that the jobs are properly being processed.

Continuing the description of service pool 425, image distribution service 427 may be configured to interface with distributed image storage 432. Storage 432 may comprise a plurality of different data stores and computing systems on which a distributed VHD (or other) image is stored. Testing and automation service 430 may be configured to initiate testing and outputting of test results by interacting with testing and automation module 434. Module 434 may be configured to run various software tests as initiated by a user or as part of an automated testing process. Moreover, service 430 may initiate the automation of various tasks within the testing process. Provisioning service 431 may be configured to interact with provisioning module 433 which carries out the various steps involved with provisioning a virtual machine. Monitoring service 429 may be configured to monitor any or all of the pending tasks such as job queuing, job servicing, VHD distribution, testing, provisioning, etc.

Method 300 also includes an act of the virtual service layer automatically instantiating the one or more virtual machines on at least one virtual machine host based on the following: the accessed provisioning schema, the read-only parent virtual hard disk image and the user-supplied files, such that each virtual machine is provisioned using the virtual hard disk image as a template and is modified by the schema configuration settings and by the user-supplied files (act 340). For example, virtual service layer 420 may instantiate various virtual machines on various virtual machine hosts (e.g. VM C1 on host C) based on the following: provisioning schema 116, the read-only parent virtual hard disk image and any user-supplied files. In this manner, each virtual machine is provisioned using the virtual hard disk image as a template and is modified by the schema configuration settings and by the user-supplied files. Accordingly, as mentioned above, a user may supply files and/or configuration settings, along with any settings indicated in the provisioning schema to create fully customized VM's tailored to the user's exact needs. These settings, files and schemas are updatable on-the-fly, giving the user full control over each group of VM's created.

Accordingly, means are described for easily and automatically creating and modifying virtual machines. The creation of VM's may be controlled by customizable workflows that are modifiable by parameters supplied at the time of creation. Moreover, virtual machine creation may be easily automated and changed on-the-fly by allowing the user to supply files, settings and or schema changes at the time of creation which are applied the newly created virtual machines. Means are also provided for allowing a third parties to create, control and manage their own set of virtual machines including machines created by third party software.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including a processor and a memory, in a computer networking environment including a plurality of computing systems, a computer-implemented method for dynamically creating and managing a plurality of virtual machines, the method comprising:

an act of the computer system receiving a user request, the user request requesting to create a plurality of virtual machines, wherein each virtual machine is controlled by an associated workflow;

an act of the computer system accessing a provisioning schema that indicates one or more configuration settings that are to be used by the associated workflow when provisioning each of the plurality of virtual machines;

an act of the computer system initiating a virtual service layer that is configured to support multiple virtual machine hosts, each host being configured to operate at least one virtual machine; and an act of the virtual service layer instantiating each of the plurality of virtual machines on at least one virtual machine host according to the respective configuration settings from the accessed provisioning schema, instantiating the plurality of virtual machines including directly associating a read-only virtual hard disk image with each of the plurality of virtual machines and applying the respective configuration settings to the read-only virtual hard disk image, such that each virtual machine of the plurality of virtual machines is provisioned according to the indicated configuration settings, wherein the read-only virtual hard disk image is distributed to a plurality of computer systems, such that when one computer system receives a plurality of substantially simultaneous requests for the read-only virtual hard disk image, one or more of the requests are forwarded to the other computer systems on which the virtual hard disk image has been distributed.

2. The method of claim 1, wherein the configuration settings of the provisioning schema are modifiable on-the-fly, such that newly provisioned virtual machines incorporate the modified configuration settings.

3. The method of claim 1, wherein the virtual service layer is configured to control the rate of virtual machine creation by controlling the number of hosts that are allowed to run at a given time.

4. The method of claim 3, wherein a service of the virtual service layer creates a mapping between the service and one of the virtual machine hosts, the service being configured to supply multiple virtual machine hosts without installing an agent on the host.

5. The method of claim 1, wherein the configuration settings define virtual machine structure.

6. The method of claim 1, wherein one or more additional computer systems running virtual service layers are configured to monitor the other computer systems to which they are connected, such that upon termination of a computer system, other computer system's virtual service layers can assume the workload of the terminated system.

7. The method of claim 1, further comprising an act of mapping one or more volume mount points to one or more physical or virtual disks, such that upon application initiation, the application can use the additional volume mount points increase informational bandwidth.

8. The method of claim 1, further comprising an act of providing a command specification in the provisioning schema that allows a user to run one or more provisioning commands and configure those provisioning commands with various properties that allow the user to monitor and control the execution of the provisioning commands.

9. The method of claim 8, further comprising an act of implementing functionality from a service running in another computer system's virtual service layer to perform a portion of desired work.

10. The method of claim 1, further comprising an act of providing a command-line interface to the virtual service layer, such that parameters and commands can be passed using a script.

11. The method of claim 1, further comprising:
an act of receiving one or more user-customized workflows that are to be run on a virtual service layer service; and
an act of the virtual service layer running the received user-customized workflows.

12. The method of claim 1, further comprising an act of storing and displaying each step during virtual machine provisioning, such that the user is presented with a progressional view of the virtual machine provisioning.

13. The method of claim 1, further comprising an act of storing failures and exceptions that occur during virtual machine provisioning.

14. The method of claim 13, wherein the user can dynamically implement debugging using the stored failures and exceptions.

15. The method of claim 1, further comprising:
an act of storing real-time virtual service layer state and workload information;
an act of accessing the stored state and workload information of a plurality of computer systems running virtual service layers; and
an act of load balancing between the plurality of computer systems based on determined need as indicated by each computer system's stored state and workload information.

16. A computer program product for implementing a method for automating the instantiation and provisioning of a plurality of virtual machines, the computer program product comprising one or more computer-readable storage media having stored thereon computer-executable instructions that, when executed by one or more processors of the computing system, cause the computing system to perform the method, the method comprising:
an act of the computer system receiving a user request to instantiate a plurality of virtual machines, wherein each virtual machine is controlled by an associated workflow, the user request including one or more user-supplied files that are to be stored for use during provisioning;
an act of the computer system accessing a provisioning schema that indicates one or more configuration settings that are to be used by the associated workflow when provisioning each of the plurality of virtual machines, the provisioning schema further pointing to a read-only virtual hard disk image that provides a template for provisioning the plurality of virtual machines, the read-only virtual hard disk image being distributed to a plurality of computer systems, such that when one computer system receives a plurality of substantially simultaneous requests for the read-only virtual hard disk image, one or more of the requests are forwarded to the other computer systems on which the virtual hard disk image has been distributed;
an act of the computer system initiating a virtual service layer that is configured to support multiple virtual machine hosts, each host being configured to operate at least one virtual machine; and
an act of the virtual service layer automatically instantiating each of the plurality of virtual machines on at least one virtual machine host based on the following:
the accessed provisioning schema,
the read-only virtual hard disk image, which is associated with each of the plurality of virtual machines, and
the user-supplied files,
such that each of the plurality of virtual machines is provisioned using a read-only virtual hard disk image, to which the schema configuration settings and the user-supplied files are applied during execution of each virtual machine.

17. The computer program product of claim 16, further comprising an act of incorporating an abstraction layer configured to allow a user to interface with a plurality of different virtual machine hosts.

18. A computer system comprising the following:
one or more processors;
system memory;
one or more computer-readable storage media having stored thereon computer-executable instructions that, when executed by the one or more processors, causes the computing system to perform a method for dynamically creating and managing a plurality of virtual machines, the method comprising the following:
an act of receiving a user request, the user request requesting to create a plurality of virtual machines, wherein each virtual machine is controlled by an associated workflow;
an act of accessing a provisioning schema that indicates one or more configuration settings that are to be used by the associated workflow when provisioning each of the plurality of virtual machines;
an act of initiating a virtual service layer that is configured to support multiple virtual machine hosts, each host being configured to operate at least one virtual machine; and
an act of the virtual service layer instantiating each of the plurality of virtual machines on at least one virtual machine host according to the respective configuration settings from the accessed provisioning schema, instantiating the plurality of virtual machines including directly associating a read-only virtual hard disk image with each of the plurality of virtual machines and applying the respective configuration settings to the read-only virtual hard disk image, such that each virtual machine of the plurality of virtual machines is provisioned according to the indicated configuration settings, wherein the read-only virtual hard disk image is distributed to a plurality of computer systems, such that when one computer system receives a plurality of substantially simultaneous requests for the read-only virtual hard disk image, one or more of the requests are forwarded to the other computer systems on which the virtual hard disk image has been distributed.

* * * * *